United States Patent
Aoyama et al.

(10) Patent No.: US 6,559,799 B2
(45) Date of Patent: May 6, 2003

(54) ARRAY ANTENNA RADIO COMMUNICATION APPARATUS AND CALIBRATION METHOD

(75) Inventors: Takahisa Aoyama, Yokosuka (JP); Katsuhiko Hiramatsu, Yokosuka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/936,013

(22) PCT Filed: Mar. 5, 2001

(86) PCT No.: PCT/JP01/00204
§ 371 (c)(1),
(2), (4) Date: Sep. 7, 2001

(87) PCT Pub. No.: WO01/53084
PCT Pub. Date: Jul. 26, 2001

(65) Prior Publication Data
US 2002/0135512 A1 Sep. 26, 2002

(30) Foreign Application Priority Data
Jan. 13, 2000 (JP) .......................... 2000-004554

(51) Int. Cl.$^7$ .......................... H01Q 3/00; G01S 13/00
(52) U.S. Cl. .......................... 342/377; 342/174
(58) Field of Search .......................... 342/368, 372, 342/377, 174

(56) References Cited

U.S. PATENT DOCUMENTS

| | | | | |
|---|---|---|---|---|
| 3,699,584 A | * | 10/1972 | Hrivnak et al. | 324/84 |
| 4,532,518 A | * | 7/1985 | Gaglione et al. | 333/17.1 |
| 5,027,127 A | * | 6/1991 | Shnitkin et al. | 342/174 |
| 6,172,642 B1 | * | 1/2001 | DiDomenico et al. | 342/368 |

FOREIGN PATENT DOCUMENTS

| | | | |
|---|---|---|---|
| EP | 0881704 A2 | * 12/1998 | H01Q/3/26 |
| JP | 01241203 | 9/1989 | |
| JP | 08307465 | 11/1996 | |
| JP | 11046180 | 2/1999 | |
| JP | 11068443 | 3/1999 | |
| JP | 2000013454 | 1/2000 | |
| JP | 2000295152 | 10/2000 | |
| JP | 2000053527 | 2/2001 | |

OTHER PUBLICATIONS

Passmann, C. et al, "Investigation of a Calibration Concept for Optimum Perfomrance of Adaptive Antenna Systems", 48th IEE Vehicular technology Conference, May 1998, pp. 577–580, vol. 1.*

* cited by examiner

*Primary Examiner*—Gregory C. Issing
(74) *Attorney, Agent, or Firm*—Stevens, Davis, Miller & Mosher, LLP

(57) ABSTRACT

The recording section 114 records a highly reliable amount of correction for phase rotation, which is obtained in advance by a sufficient number of samples before commencement of communications. The measurement section 112 measures the amount of phase rotation of the known signals, and the comparison section 113 compares the measured amount of phase rotation with the amount of correction and renews the amount of correction from time to time during communications on the basis of the results of the comparison.

7 Claims, 6 Drawing Sheets

ARRAY ANTENNA RADIO COMMUNICATION APPARATUS AND CALIBRATION METHOD

TECHNICAL FIELD

The present invention relates to an array antenna radio communication apparatus and a calibration method.

BACKGROUND ART

An array antenna radio communication apparatus is a radio communication apparatus that is provided with a plurality of antennas and enables free setting of directivities by adjusting an amplitude and a phase of respective signals that are received by the respective antennas. The adjustment of the amplitude and the phase with respect to the received signals is carried out by multiplying the received signals by a complex coefficient (hereinafter, the complex coefficient is called a "weight").

The array antenna radio communication apparatus is capable of intensively receiving signals arriving from a desired direction by adjusting the weight to be multiplied. This means that the apparatus has a "receiving directivity". The array antenna radio communication apparatus is able to highly maintain a receiving SIR (Signal to Interference Ratio) of signals arriving from respective directions by having the receiving directivity.

However, in the array antenna radio communication apparatus, the characteristics of the radio receiving circuits, by which the frequencies of the respective signals received through a plurality of antennas are down-converted to base band, are different from each other, depending on unevenness in the characteristics of analog elements such as an amplifier, etc. Therefore, there may be a case where a directivity is formed that is different from a directivity that is expected to be obtained by multiplying by a weight due to the fact that received signals are provided with different unknown amplitude fluctuations and phase rotations.

In order to prevent such situations from occurring, it is necessary to adjust the characteristics that the radio receiving circuits have, so as to be made the same. However, it is remarkably difficult to accurately adjust the characteristics of analog elements such as an amplifier, etc., time-constantly. Accordingly, such a method is employed, in which the characteristics held by the radio receiving circuits each are measured and recorded in a memory without adjusting the characteristics of the radio receiving circuits, and a weight to be used for multiplication is decided by taking it into consideration that the amplitude and phase of the received signals are changed by errors in characteristics. Such a method is called "Calibration".

There are two types of calibration, one (1) of which is that errors in characteristics of radio receiving circuits are measured in advance by a calibration signal being a known signal before commencement of communications, the results of the measurement are stored in advance in a correction table as characteristic errors to be corrected during communications, and receiving processing is carried out so that errors in characteristics of the radio receiving circuits are counterbalanced by using the permanent correction table during communications, while (2) of which is that, in order to cope with chronological changes in the characteristics of radio receiving circuits, errors in characteristics of the radio receiving circuits are measured from time to time by calibration signals during communications, the results of the measurement are stored from time to time in a correction table as characteristic errors to be corrected, and receiving processing is carried out so that errors in characteristics of the radio receiving circuits are counterbalanced by using the adaptive correction table.

However, the following problems exist in the conventional array antenna radio communication apparatus and calibration method.

That is, 1) in a method in which calibration is performed before commencement of communications, since receiving processing is carried out by using a permanent correction table during communications, the method cannot cope with an amount of phase rotation that changes with the elapse of time and heating of the radio receiving circuits. Therefore, reliability in the results of calibration deteriorates with the elapse of time, thereby deteriorating the performance of the array antenna radio communication apparatus.

On the contrary, 2) in a method in which calibration is carried out during communications, since it is not possible to obtain reliable results of calibration unless there are many samples concerning the results of the measurement, it is necessary to transmit calibration signals a sufficient number of times during communications. But, the greater the number of times of transmission of calibration signals is made, the worse the receiving quality of communication signals becomes because the calibration signals interfere with the communication signals. Also, since there is a limitation in the amount of transmissions in which the calibration signals and communication signals are combined, the greater the number of times of transmission of calibration signals is made, the greater the amount of transmission of communication signals is reduced, whereby the transmission efficiency of user data is lowered. Further, since a sufficient number of samples corresponding to the respective receiving power values are not obtainable if there are a few samples in the results of the measurement, a case occurs where the reliability in the results of the calibration is lowered in the case where the receiving power value of the communication signals changes with the elapse of time. Accordingly, the performance of the array antenna radio communication apparatus may deteriorate.

DISCLOSURE OF INVENTION

It is therefore an object of the invention to provide an array antenna radio communication apparatus and a calibration method, by which calibration can be accurately carried out while suppressing interference with communications.

The inventors of the present invention found out that the reliability in calibration can be prevented from being lowered with the elapse of time while suppressing interference with communications, by using both calibration that is performed before commencement of communications and calibration that is performed after commencement of communications while making the functions of the calibrations different from each other, and arrived at the present invention.

Therefore, in order to achieve the above-described object, the present invention utilizes calibration that is performed before the commencement of communications, in order to obtain in advance the amount of correction having high reliability on the basis of a sufficient number of samples before the commencement of communications, and utilizes calibration that is performed after the commencement of communications, in order to maintain reliability in the amount of correction by adjusting the amount of correction on the basis of a small number of samples during communications.

BEST MODE FOR CARRYING OUT THE INVENTION

Hereinafter, a detailed description is given of an embodiment of the invention with reference to the accompanying drawings.

Figure 1:
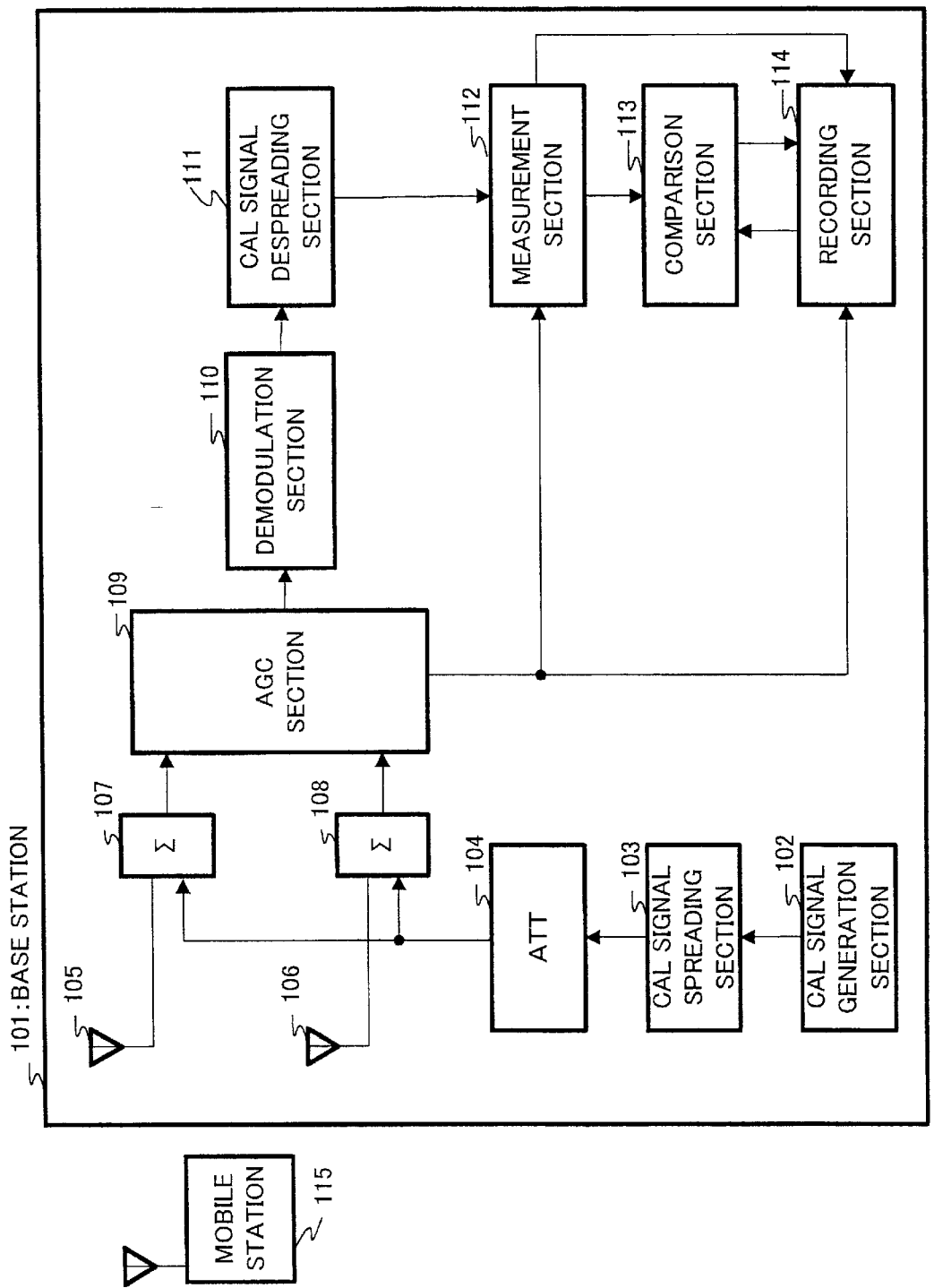
FIG. 1 is a block diagram showing a configuration of a communication system using an array antenna radio communication apparatus according to one embodiment of the invention.

FIG. 1 is a block diagram showing a configuration of a communication system using an array antenna radio communication apparatus according to one embodiment of the invention. This block diagram shows a state where a base station 101 having an array antenna radio communication apparatus according to this embodiment makes communications with a mobile station 115.

The mobile station 115 transmits radio signals to the base station 101.

In the base station 101, a calibration signal (hereinafter called a "CAL signal") generating section 102 generates a CAL signal. A CAL signal spreading section 103 provides spreading processing to the CAL signal. An attenuator 104 controls the power of the CAL signal.

Adders 107 and 108 multiplex signals from the mobile station 115, which are received via antennas 105 and 106, and CAL signals. An AGC (Auto Gain Control) section 109 outputs the power of the signals while making it constant. A demodulator 110 performs predetermined demodulation processing on signals. A CAL signal despreading section 111 provides despreading processing to the signals and picks up CAL signals. A measurement section 112 measures the amount of phase rotation of the CAL signals. A comparison section 113 compares the amount of phase rotation measured by the measurement section 112 with the contents of the correction table stored in a recording section 114, and renews the correction table. The correction table that is prepared on the basis of the results of measurement made by the base station 101 before commencement of communications is stored in the recording section 114 as its initial state, and the correction table is renewed from time to time during the communications of the base station 101 in compliance with the results of comparison made by the comparison section 113.

In addition, although, in the base station, a plurality of systems (equivalent to the number of mobile stations) consisting of components from the demodulating section 110 to the recording section 114 are usually provided in order to demodulate the received signals from a plurality of mobile stations, in this embodiment, a description is given of only one system for the convenience of description.

Figure 2:
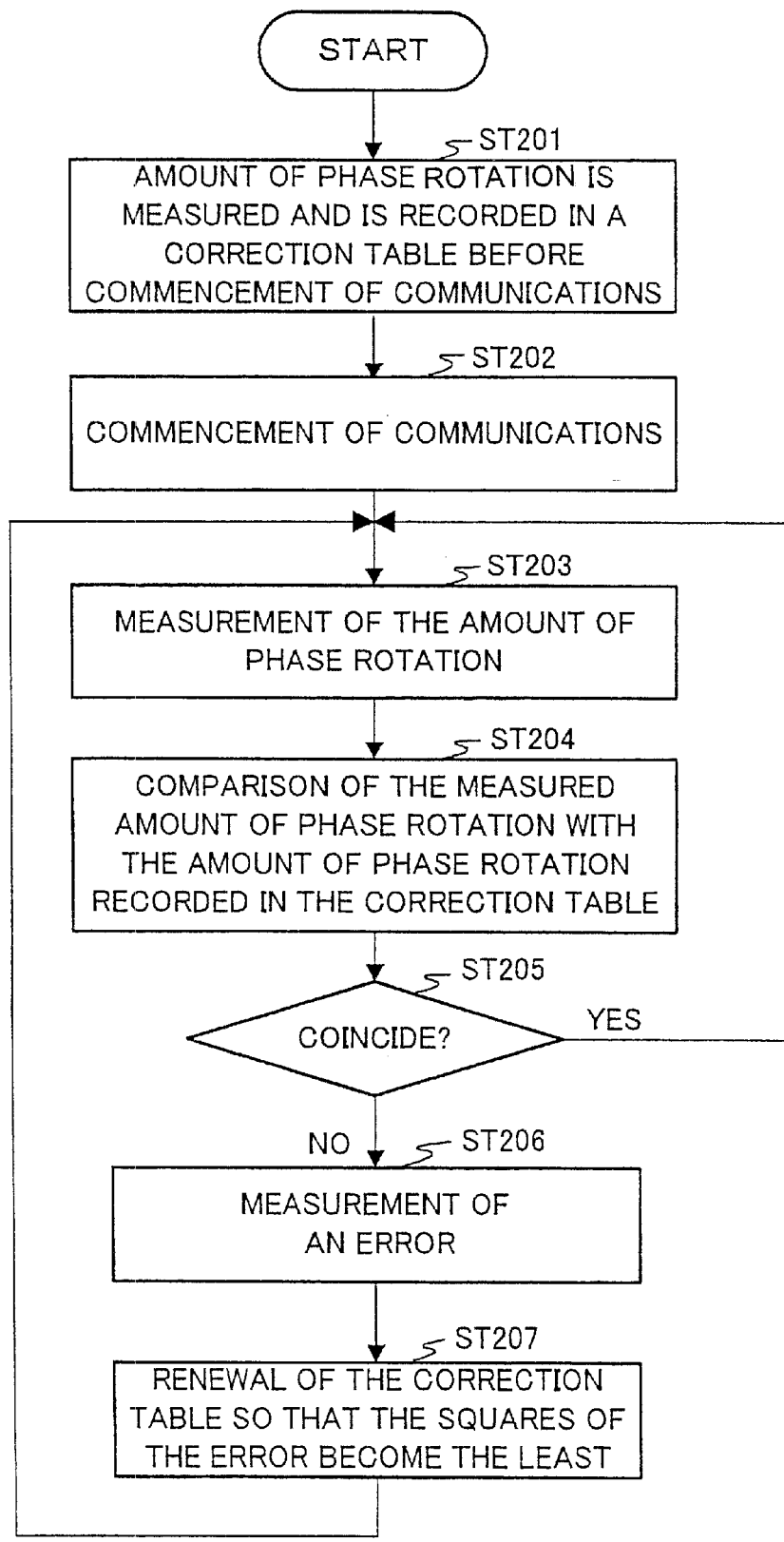
FIG. 2 is a flow chart explaining the operations of an array antenna radio communication apparatus according to the embodiment of the invention.
Figure 3A:
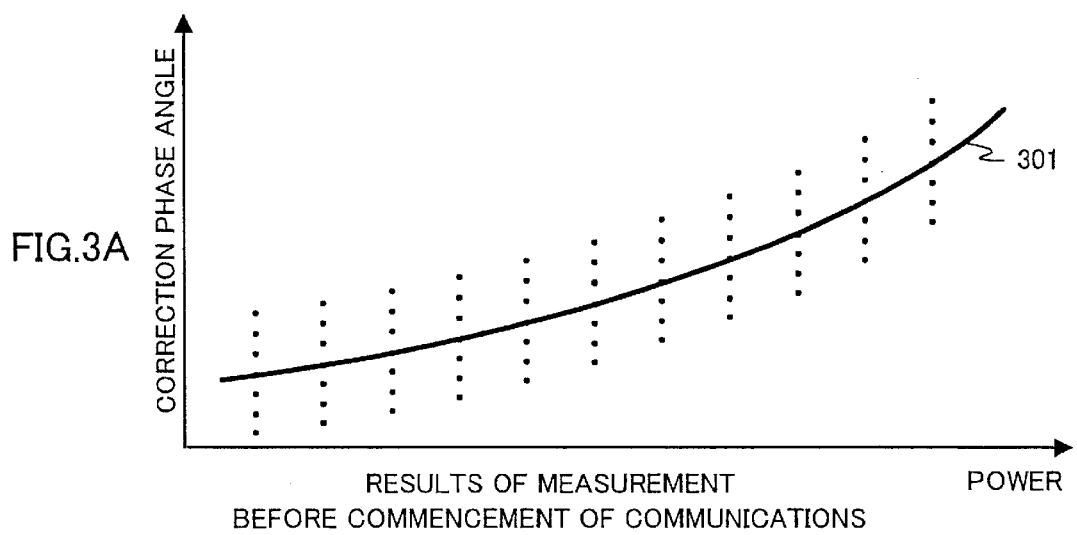
FIG. 3A is a view showing the contents of a correction table with which an array antenna radio communication apparatus according to the embodiment of the invention is provided.
Figure 3B:
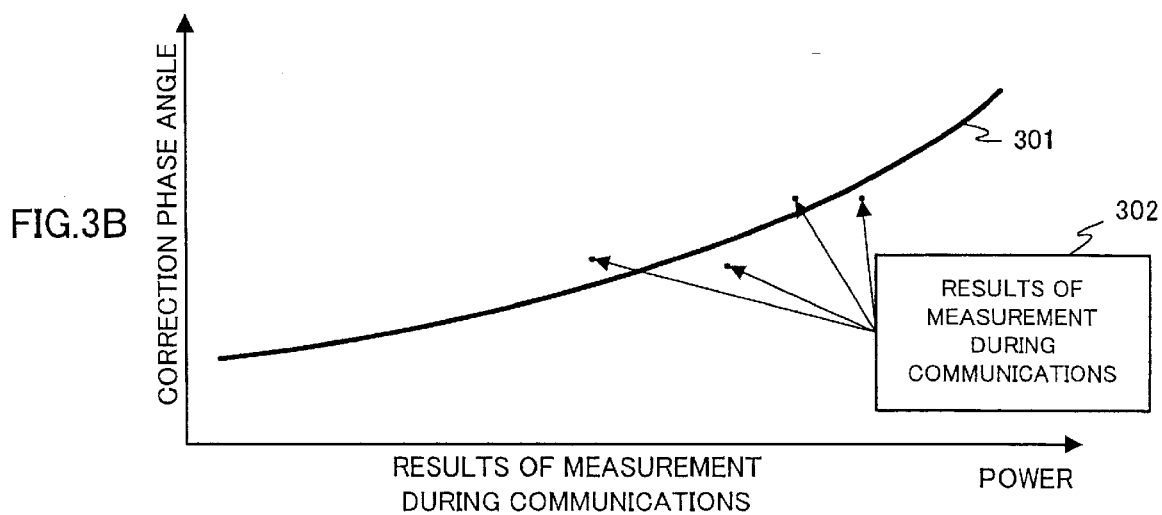
FIG. 3B is a view showing the contents of a correction table with which an array antenna radio communication apparatus according to the embodiment of the invention is provided.
Figure 3C:
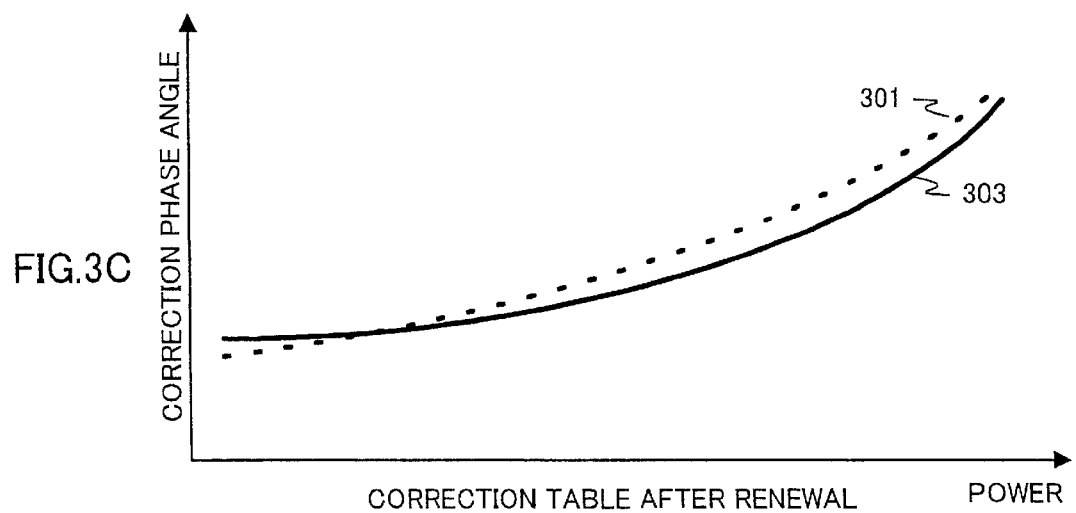
FIG. 3C is a view showing the contents of a correction table with which an array antenna radio communication apparatus according to the embodiment of the invention is provided.
Figure 4:
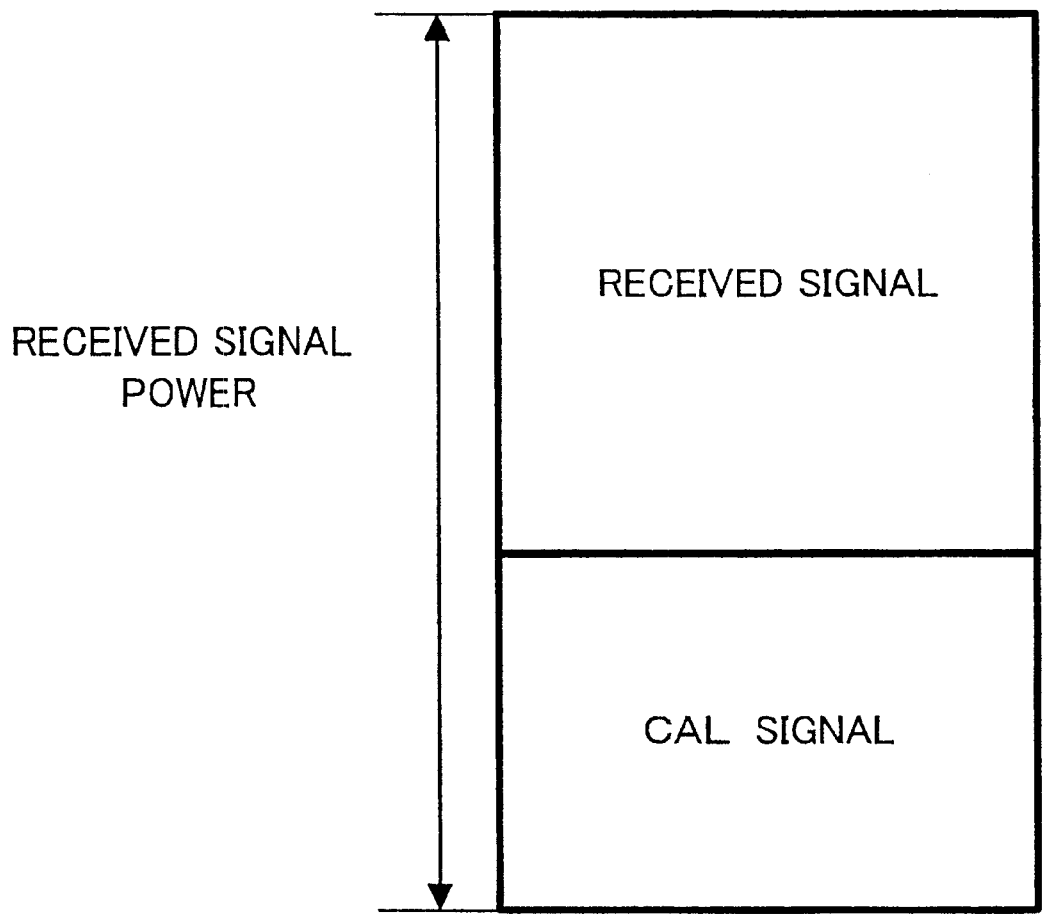
FIG. 4 is an exemplary view showing a state where an array antenna radio communication apparatus according to the embodiment of the invention received signals and CAL signals are multiplexed.

Next, a description is given of the operations of an array antenna radio communication apparatus having the above-described configuration with reference to FIG. 2 through FIG. 4. FIG. 2 is a flow chart explaining the operations of an array antenna radio communication apparatus according to the embodiment of the invention. FIG. 3A through FIG. 3C are views showing the contents of a correction table, with which an array antenna radio communication apparatus according to the embodiment of the invention is provided. FIG. 4 is an exemplary view showing a state where an array antenna radio communication apparatus according to the embodiment of the invention received signals and CAL signals are multiplexed. Also, as shown in FIG. 3A through FIG. 3C, graphs showing the relationship between the power value and the correction value of phase rotation are used herein as a correction table.

In FIG. 2, in Step (hereinafter called "ST") 201, the base station 101 measures the amount of phase rotation corresponding to the power value before commencement of communications while changing the power value of CAL signals, and stores the results of the measurement in the correction table.

Specifically, the CAL signals that are generated by the CAL signal generating section 102 are subjected to spreading processing by the CAL signal spreading section 103, and the attenuator 104 gradually varies the power value. After that, the AGC section 109 turns the power value of the CAL signals into predetermined constant values and outputs the CAL signals to the demodulating section 110. At this time, the AGC section 109 outputs values indicating the amount of the change in the power value to the measurement section 112 and recording section 114.

The CAL signals that are demodulated by the demodulation section 110 are despread by the CAL signal despreading section 111. Then, the CAL signals are outputted to the measurement section 112. The measurement section 112 measures the amount of phase rotation of the CAL signals after returning the CAL signals to the original power values in compliance with the values indicating the amount of the changes in the power values that are outputted from the AGC section 109. Since the CAL signals are the known signals, the measurement section 112 measures the amount of phase rotation by comparing the despread CAL signals with the known signals. The measured amount of phase rotation is outputted to the recording section 114.

The recording section 114 gradually plots the amount of phase rotation (correction phase angle) with respect to the respective power values, as shown in FIG. 3A, in compliance with the values indicating the amount of the changes of the power values that are outputted from the AGC section 109.

By repeating the above-described operations, a correction table 301 having high reliability as shown in FIG. 3A is stored in advance in the recording section 114 on the basis of a sufficient number of samples before commencement of communications.

Next, in ST202, after communications are commenced, the base station 101 carries out processes shown in ST202 through ST207 during communications, and the correction table is renewed from time to time. After communications are commenced, the base station 101 operates as shown below. Also, in the following description, a detailed description is omitted in connection with parts that becomes similar to those before commencement of communications.

In the base station 101, CAL signals that are outputted from the attenuator 104 and received signals from a mobile station 115 are multiplexed by the adders 107 and 108 as shown in FIG. 4. The multiplexed signals are made into predetermined constant values by the AGC section 109 and demodulated by the demodulation section 110. The demodulated signals are despread by the CAL signal despreading section 111, wherein the CAL signals are picked up.

Next, the processes shown in ST203 through ST207 are repeated. First, in ST203, the measurement section 112 measures the amount of phase rotation of the CAL signals. In detail, the measurement section 112 measures the amount of phase rotation of the CAL signals after returning the CAL signals to the original power value (the received signal power shown in FIG. 4) in compliance with the values indicating the amount of the changes in the power values that are outputted from the AGC section 109, and outputs the results of the measurement to the comparison section 113.

Next, in ST204, the comparison section 113 compares the amount of phase rotation that was measured by the measurement section 112 with the values in the correction table, which are stored in the recording section 114, once every predetermined duration of time. Specifically, as shown in FIG. 3B, the comparison section 113 compares the results 302 of the measurement during communications with the contents of the correction table 301 with respect to the respective power values.

Next, in ST205, in a case where the results 302 of the measurement during communications are different from the contents of the correction table 301, the comparison section 113 measures an error between the results 302 of the measurement during communications and the contents of the correction table 301 in ST206. And the comparison section 113 renews the correction table 301, which is stored in the recording section 114, to a correction table 303 as shown in FIG. 3C, so as to minimize the square of the measured error. Then, the base station 101 corrects the phase rotation with respect to the received signals by using the correction table that is renewed from time to time.

Herein, as can be seen from FIG. 3A through FIG. 3C, the correction table 301 having high reliability, which has been obtained in advance on the basis of a sufficient number of samples before commencement of communications, is renewed to a correction table 303 from time to time by the results 302 of the measurements during communications. Therefore, the reliability in the correction table can be maintained to be high, whereby it is possible to prevent the performance of an array antenna radio communication apparatus from deteriorating due to a lowering in the reliability in the results of the calibration with the elapse of time.

Since a highly reliable correction table 301 is obtained in advance based on a sufficient number of samples before commencement of communications, it is possible to obtain the results 302 of the measurements during communications by a small number of samples sufficient to maintain the reliability. Therefore, in comparison with the conventional method of carrying out calibration only during communications, a very small number of samples are adequate during the communications. Therefore, since the number of times of generation of CAL signals that will cause interference with the communication signals can be remarkably reduced, it is possible to prevent the receiving quality of communication signals from deteriorating.

Thus, calibration that is carried out before commencement of communications in order to obtain a highly reliable amount of corrections, and calibration that is carried out after the commencement of communications in order to maintain the reliability in the amount of corrections are utilized. That is, calibration that is performed before commencement of communications and calibration that is performed after the commencement of communications are performed together while making their roles different from each other, whereby it is possible to prevent the reliability in the calibration from being lowered with the elapse of time while suppressing interference with communications.

On the other hand, in ST205, in the case where the results 302 of the measurement during communications are coincident with the contents of the correction table 301, the process returns to ST203, wherein the processes from ST203 through ST205 are repeated.

Figure 5:
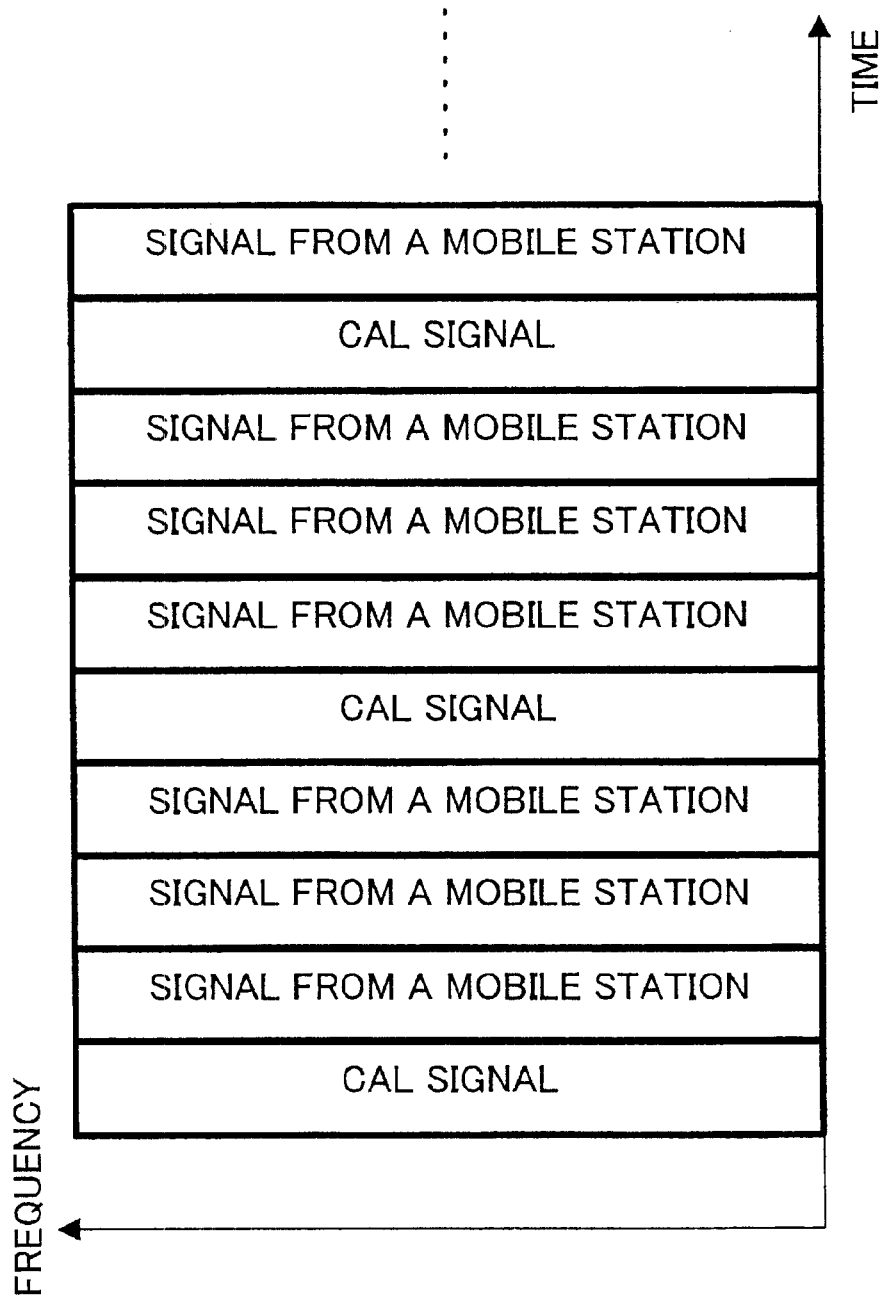
FIG. 5 is an exemplary view showing a state where an array antenna radio communication apparatus according to the embodiment of the invention received signals and CAL signals are multiplexed.
Figure 6:
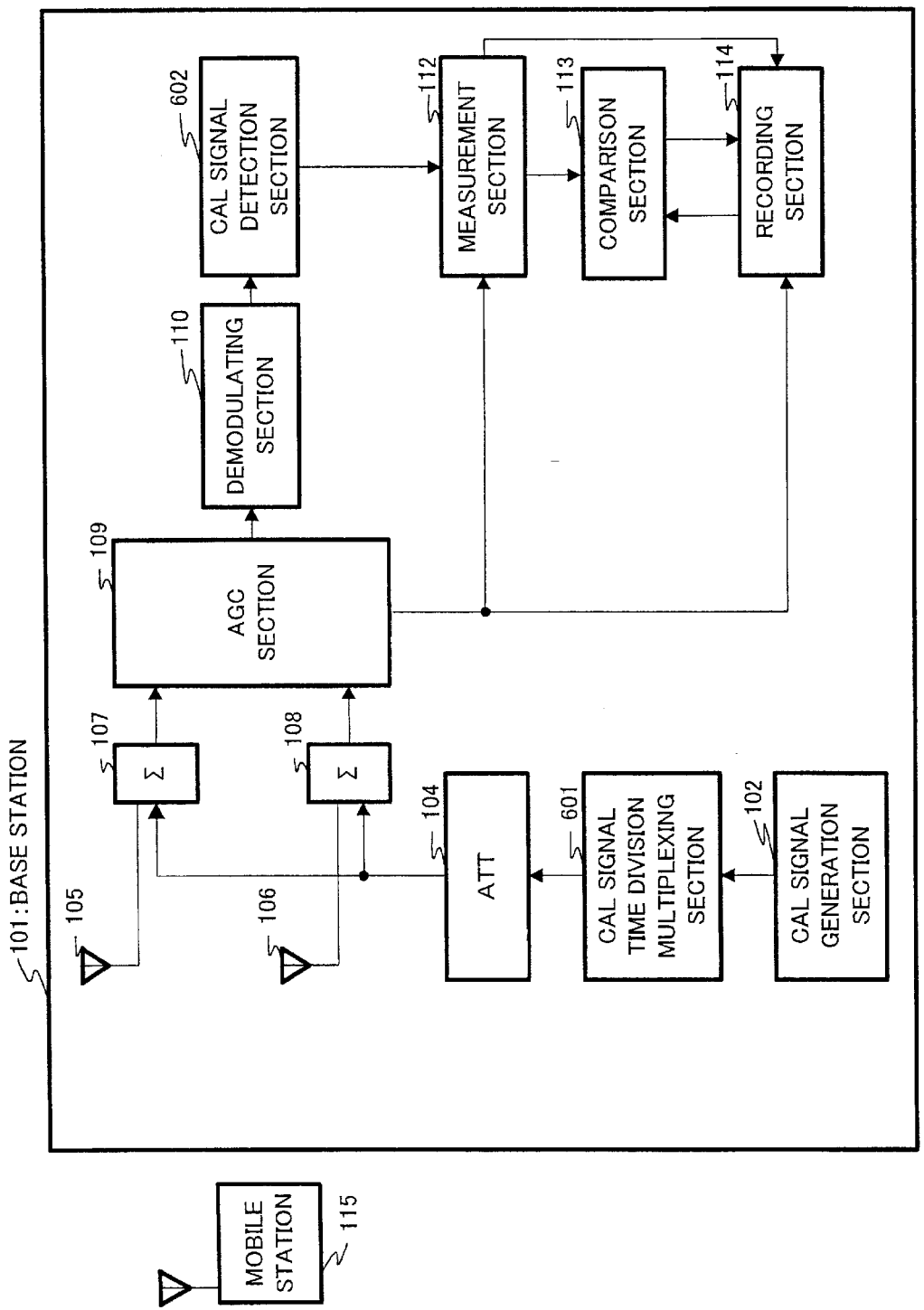
FIG. 6 is a block diagram showing a configuration of a communication system using an array antenna radio communication apparatus according to the embodiment of the invention.

In the above-described embodiment, it is possible to multiplex the CAL signals on the signals from the mobile station 115 by time division as shown in FIG. 5. In this case, the configuration of the base station 101 becomes as shown in FIG. 6. Also, in FIG. 6, parts that are identical to those in FIG. 1 are given the same reference numbers, and an overlapping description thereof is omitted. In FIG. 6, a CAL signal time division multiplexing section 601 multiplexes CAL signals at a load-free (empty) time with respect to signals from the mobile station 115. A CAL signal detection section 602 picks up CAL signals from the demodulated signals and outputs the CAL signals to the measurement section 112.

Also, in this embodiment, the description was given of the method for renewing the correction table using the least-squares method. However, the method for renewing the correction table is not limited to this method. The correction table may be renewed by using other adaptive algorithms.

Thus, according to the array antenna radio communication apparatus and the calibration method of this embodiment, highly reliable contents of correction, which have been obtained in advance by a sufficient number of samples before commencement of communications, are corrected from time to time by a small number of samples during the communications in order to maintain the reliability thereof. Therefore, in contrast to the conventional case where, if an attempt is made to accurately carry out calibration, the interference with communications will be increased, while if an attempt is made to reduce the interference with communications, the accuracy of the calibration will be decreased, according to the array antenna radio communication apparatus and the calibration method of this embodiment, since it is possible to carry out calibration with high accuracy while suppressing the interference with communications, it is possible to suppress the interference with communications and to achieve the calibration with high accuracy.

As described above, according to the invention, calibration can be accurately carried out while suppressing interference with communications.

This application is based on the Japanese Patent Application No. 2000-004554 filed on Jan. 13, 2000, entire content of which is expressly incorporated by reference herein.

INDUSTRIAL APPLICABILITY

The present invention is applicable to a base station apparatus that is used for a mobile communication system. Where applied, it is possible to carry out calibration with high accuracy with respect to signals that are received from mobile stations while suppressing interference with communications with mobile stations.

What is claimed is:

1. An array antenna radio communication apparatus comprising:

an array antenna that comprises a plurality of antenna elements;

a generator that generates a known signal;

a receiver that performs reception processing on signals received by the respective antenna elements and on said known signal;

a calculator that, by using the known signal processed by said receiver, obtains an amount of correction to a phase rotation caused by said receiver;

a recorder that records the amount of correction obtained by said calculator before commencement of communication;

a measurer that, during communication, measures an error between the amount of correction obtained by said calculator before commencement of communication and an amount of correction obtained by said calculator during communication; and a renewer that, during communication, obtains a new amount of correction based on the error and renews the amount of correction recorded in said recorder with the new amount of correction, wherein:

said generator makes the number of times the known signal is generated during communication smaller than the number of times the known signal is generated before commencement of communication.

2. The array antenna radio communication apparatus according to claim 1, further comprising a multiplexer that multiplexes the received signals with the known signal during communication.

3. The array antenna radio communication apparatus according to claim 1, wherein said renewer renews the amount of correction recorded in said recorder so as to minimize a square of the error.

4. The array antenna radio communication apparatus according to claim 1, wherein said renewer, by using an adaptive algorithm, renews the amount of correction recorded in said recorder.

5. The array antenna radio communication apparatus according to claim 1, further comprising:

a changer that changes a power level of the known signal, wherein:

said recorder records the amount of correction for each changed power level, and said renewer renews the amount of correction recorded in said recorder for each changed power level.

6. A base station apparatus comprising the array antenna radio communication apparatus of claim 1.

7. A calibration method comprising:

obtaining an amount of correction to a phase rotation by using a known signal;

recording the amount of correction, obtained before commencement of communication, into a recorder;

measuring, during communication, an error between the amount of correction obtained before commencement of communication and an amount of correction obtained during communication;

obtaining, during communication, a new amount of correction based on said error and renewing the amount of correction recorded in said recorder with the new amount of correction; and performing a calibration by using the renewed amount of correction, wherein:

the number of times the known signal is generated during communication is made smaller than the number of times the known signal is generated before commencement of communication.

* * * * *

UNITED STATES PATENT AND TRADEMARK OFFICE
CERTIFICATE OF CORRECTION

PATENT NO. : 6,559,799 B2  Page 1 of 1
DATED : May 6, 2003
INVENTOR(S) : Aoyama et al.

It is certified that error appears in the above-identified patent and that said Letters Patent is hereby corrected as shown below:

<u>Title page,</u>
Item [22], PCT Filed: "Mar. 5, 2001" should read -- Jan. 15, 2001 --
Item [87], PCT Pub. No.: "WO01/53084" should read -- WO01/52446 --
   PCT Pub. Date: "Jul. 26, 2001" should read -- Jul. 19, 2001 --

Signed and Sealed this

Sixteenth Day of September, 2003

JAMES E. ROGAN
*Director of the United States Patent and Trademark Office*